United States Patent
Chapman et al.

(10) Patent No.: US 10,832,469 B2
(45) Date of Patent: Nov. 10, 2020

(54) OPTIMIZING IMAGES FOR THREE-DIMENSIONAL MODEL CONSTRUCTION

(71) Applicant: Disney Enterprises, Inc., Burbank, CA (US)

(72) Inventors: Steven M. Chapman, Dos Vientos Ranch, CA (US); Steven T. Kosakura, Tustin, CA (US); Joseph M. Popp, Cerritos, CA (US); Mehul A. Patel, Stevenson Ranch, CA (US)

(73) Assignee: Disney Enterprises, Inc., Burbank, CA (US)

( * ) Notice: Subject to any disclaimer, the term of this patent is extended or adjusted under 35 U.S.C. 154(b) by 86 days.

(21) Appl. No.: 16/056,266

(22) Filed: Aug. 6, 2018

(65) Prior Publication Data
US 2020/0043227 A1  Feb. 6, 2020

(51) Int. Cl.
*G06T 17/05* (2011.01)
*G06K 9/00* (2006.01)
(Continued)

(52) U.S. Cl.
CPC .......... *G06T 17/05* (2013.01); *G06K 9/00234* (2013.01); *G06K 9/6202* (2013.01);
(Continued)

(58) Field of Classification Search
CPC ................. G06T 19/20; G06T 15/205; G06T 2207/10028; G06T 17/00; G06T 2207/10012; G06T 2207/30244; G06T 7/33; G06T 7/593; G06T 2200/04; G06T 7/11; G06T 7/20; G06T 7/70; G06T 7/73; G06T 7/74; G06T 7/85; G06T 19/006; G06T 2200/08; G06T 2207/20228; G06T 2219/004; G06T 7/00; G06T 7/0014; G06T 7/285; G06T 7/55; G06T 7/97;
(Continued)

(56) References Cited

U.S. PATENT DOCUMENTS 10,134,004 B1 * 11/2018 Liberato, Jr. ........ G06Q 10/087
2009/0244062 A1 * 10/2009 Steedly .................. G06T 17/00
345/420

(Continued)

OTHER PUBLICATIONS

E. Vural and A. A. Alatan, "Outlier Removal for Sparse 3D Reconstruction from Video", 2008 3DTV Conference: The True Vision—Capture, Transmission and Display of 3D Video, Istanbul, Turkey, 2008, pp. 341-344. <http://ieeexplore.ieee.org/stamp/stamp.jsp?tp=&arnumber=4547878&isnumber=4547776>.

*Primary Examiner* — Xiao M Wu
*Assistant Examiner* — Scott E Sonners
(74) *Attorney, Agent, or Firm* — Patterson + Sheridan, LLP

(57) ABSTRACT

Methods, systems, and computer readable media related to generating a three-dimensional model of a target object. A first source image, of a plurality of source images of a target object, is analyzed to identify a first region of the first image, the first region having attributes meeting one or more pre-defined criteria. The first region is marked for exclusion from use in generating a three-dimensional model of the target object. The three-dimensional model of the target object is generated using the plurality of source images. The marked first region is excluded in the generation of the three-dimensional model.

19 Claims, 8 Drawing Sheets

(51) Int. Cl.
*G06K 9/62* (2006.01)
*G06T 17/00* (2006.01)

(52) U.S. Cl.
CPC .... *G06T 17/00* (2013.01); *G06T 2207/10028* (2013.01); *G06T 2207/30184* (2013.01)

(58) Field of Classification Search
CPC .................. G06T 15/10; G06T 19/00; G06T 2207/10016; G06T 2207/20012; G06T 7/12; G06T 7/13; G06T 7/174; G06T 7/194; G06T 7/246; G06T 7/248; G06T 7/30; G06T 7/50; G06T 7/564; G06T 7/579; G06T 7/60; G06T 7/62; G06T 9/00; H04N 13/282; H04N 13/243; H04N 13/111; H04N 13/117; H04N 13/279; G06K 9/00671; G06K 9/22201; G06K 9/00208; G06K 9/4609; G06K 9/6201; G06K 9/6202; G06K 9/6212
See application file for complete search history.

(56) References Cited

U.S. PATENT DOCUMENTS

| | | | | |
|---|---|---|---|---|
| 2014/0037189 | A1* | 2/2014 | Ziegler | G06T 17/00 |
| | | | | 382/154 |
| 2017/0372527 | A1* | 12/2017 | Murali | G01S 17/00 |
| 2018/0139431 | A1* | 5/2018 | Simek | H04N 13/254 |

\* cited by examiner

OPTIMIZING IMAGES FOR THREE-DIMENSIONAL MODEL CONSTRUCTION

BACKGROUND

Field of the Invention

The present invention relates to construction of a three-dimensional model of an object.

Description of the Related Art

A series of two dimensional images of an object can be used to construct a three-dimensional model of the object. But this process can be time consuming and computationally expensive, and can result in an inaccurate three-dimensional model. It is desirable to improve construction of a three-dimensional model from a series of two dimensional images.

SUMMARY

Embodiments described herein include a method of generating a three-dimensional model of a target object. The method includes analyzing a first source image, of a plurality of source images of a target object, to identify a first region of the first image, the first region having attributes meeting one or more pre-defined criteria. The method further includes marking the first region for exclusion from use in generating a three-dimensional model of the target object. The method further includes generating the three-dimensional model of the target object using the plurality of source images. The marked first region is excluded in the generation of the three-dimensional model.

Embodiments described herein further include a computer program product for generating a three-dimensional model of a target object. The computer program product includes a computer-readable storage medium having computer-readable program code embodied therewith. The code, when executed by a processor, performs an operation. The operation includes analyzing a first source image, of a plurality of source images of a target object, to identify a first region of the first image, the first region having attributes meeting one or more pre-defined criteria. The operation further includes marking the first region for exclusion from use in generating a three-dimensional model of the target object. The operation further includes generating the three-dimensional model of the target object using the plurality of source images. The marked first region is excluded in the generation of the three-dimensional model.

Embodiments described herein further include a system. The system includes a processor and a memory storing a program, which, when executed on the processor, performs an operation. The operation includes analyzing a first source image, of a plurality of source images of a target object, to identify a first region of the first image, the first region having attributes meeting one or more pre-defined criteria. The operation further includes marking the first region for exclusion from use in generating a three-dimensional model of the target object. The operation further includes generating the three-dimensional model of the target object using the plurality of source images. The marked first region is excluded in the generation of the three-dimensional model.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
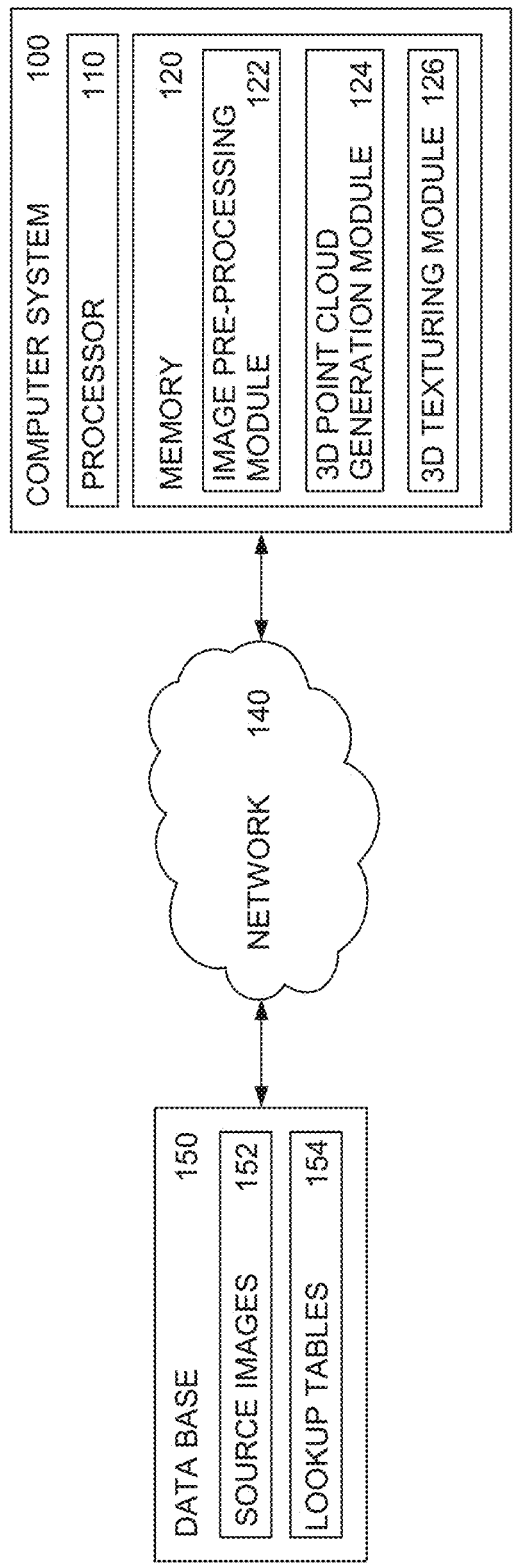
FIG. 1 is a block diagram illustrating a computer system for use in generating a three-dimensional model of an object using a series of two dimensional images, according to an embodiment.

Using photogrammetry, a three-dimensional model for a target object can be estimated using a series of two dimensional images of the object from different perspectives. But this process may be time consuming, computationally expensive, and inaccurate. For example, photogrammetry techniques can be used to combine all the images taken of the object to create the three-dimensional model. But because the different two dimensional images of the object are from different perspectives, the different images will have clear views of some portions of the target object and less clear views of other portions. This means that an image with a clear view of a portion of an object is combined with an image with a less clear view. This is wasteful, and can result in a less accurate three-dimensional model.

According to one or more embodiments herein, these techniques can be improved by pre-processing the source two-dimensional images to identify image regions that should not be used in generating the three-dimensional model. Identifying these image regions for exclusion, before generating the three-dimensional model, significantly speeds up generation of the three-dimensional model (because fewer pixels are processed from each image), and improves accuracy by ignoring misleading or inaccurate portions of the source images (e.g., portions of the source image that are blurry or unfocused). In an embodiment, the excluded image regions can be left out of generation of a three-dimensional point cloud, but included in generation of textures for the three-dimensional model.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the image pre-processing module 122, the 3D point cloud generation module 124, and the 3D texturing module 126) or related data available in the cloud. For example, the image pre-processing module 122, the 3D point cloud generation module 124, and the 3D texturing module 126 could execute on a computing system in the cloud and pre-process the source images and generate the three-dimensional model. In such a case, the modules could pre-process the images and generate the three-dimensional model and store the pre-processed images (or related data) and the three-dimensional model at a storage location in the cloud. [Doing so allows a user to access this information from any computing system attached to a network connected to the cloud (e.g., the Internet).

FIG. 1 is a block diagram illustrating a computer system for use in generating a three-dimensional model of an object using a series of two dimensional images, according to an embodiment. A computer system 100 includes a processor 110 and a memory 120. The processor 110 generally retrieves and executes programming instructions stored in the memory 120. The processor 110 is included to be representative of a single central processing unit (CPU), multiple CPUs, a single CPU having multiple processing cores, graphics processing units (GPUs) having multiple execution paths, and the like. The memory 120 is generally included to be representative of electronic storage of any suitable type(s), including random access memory or non-volatile storage.

The memory 120 generally includes program code for performing various functions related to generating the three-dimensional mesh model. The program code is generally described as various functional "applications," "components," or "modules" within the memory 120, although alternate implementations may have different functions and/ or combinations of functions. Within the memory 120, the image pre-processing module 122 is generally configured to analyze the two dimensional source images, identify pixels for exclusion, and mark the pixels for exclusion. The 3D point cloud generation module 124 is generally configured to generate a 3D point cloud from the series of source images, after they have been pre-processed. The 3D texturing module 126 is generally configured to generate textures for the 3D point cloud. As illustrated in FIG. 1, the modules 122, 124, and 126 are software modules executed using the processor 110. Alternatively, each of the modules 122, 124, and 126 could be implemented in hardware.

In an embodiment, the computer system 100 communicates with a database 150 through the communication network 140. The communication network 140 can be any suitable communication network, including the Internet, a local access network, or a wide access network. The communication network 140 may be wired or wireless or both. The database 150 can be any suitable electronic database. In general, the database 150 stores data for use by the modules 122, 124, and 126 in the computer system 100.

For example, the database 150 stores the source images 152 for use by the image pre-processing module 124, the 3D point cloud generation module 124, and the 3D texturing module 126. Alternatively, these source images 152 can be stored locally in the computer system 100 (e.g., in the memory 120) or in any other suitable location.

As another example, the database 150 can store a lookup table for the marked pixels for exclusion in the source images 152. In an embodiment, the image pre-processing module 122 identifies pixels for exclusion in the source images 152. In an embodiment, these pixels can be marked directly in the source images 152. Alternatively, a lookup table for each source image can be used to identify whether each pixel in the source image should be used in generating the three-dimensional point cloud. For example, the image pre-processing module 122 can mark pixels for a given image in a lookup table associated with that image, one of the lookup tables 154, and the 3D point cloud generation module 124 can exclude these marked pixels from the generation of the 3D point cloud. In an embodiment, the 3D texturing module 126 can also exclude the marked pixels. In another embodiment, the 3D texturing module 126 can use the marked pixels.

Figure 2A:
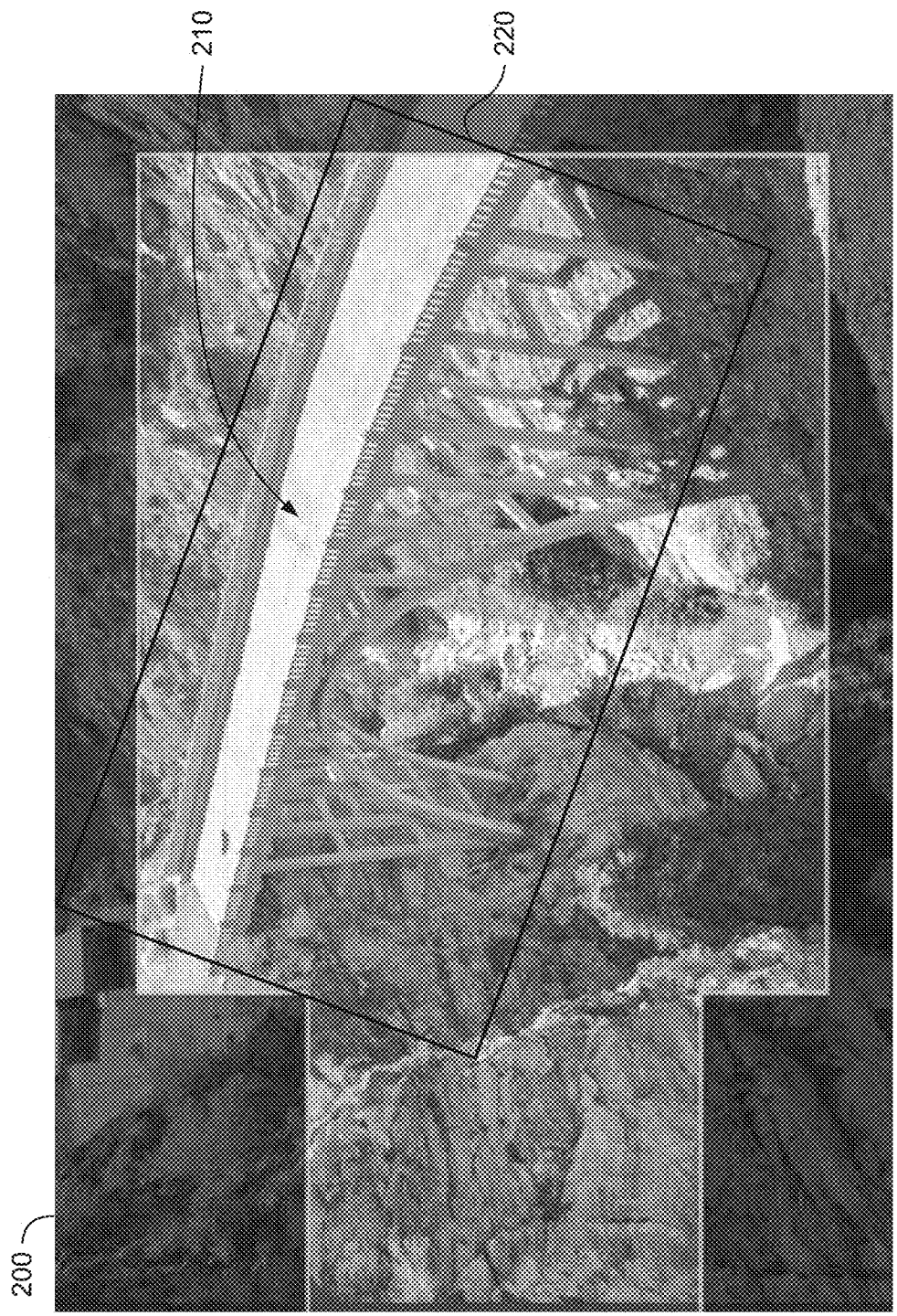
FIGS. 2A-C are illustrations of two dimensional source images used to generate a three-dimensional model of a target object, according to an embodiment.
Figure 2B:
Figure 2C:
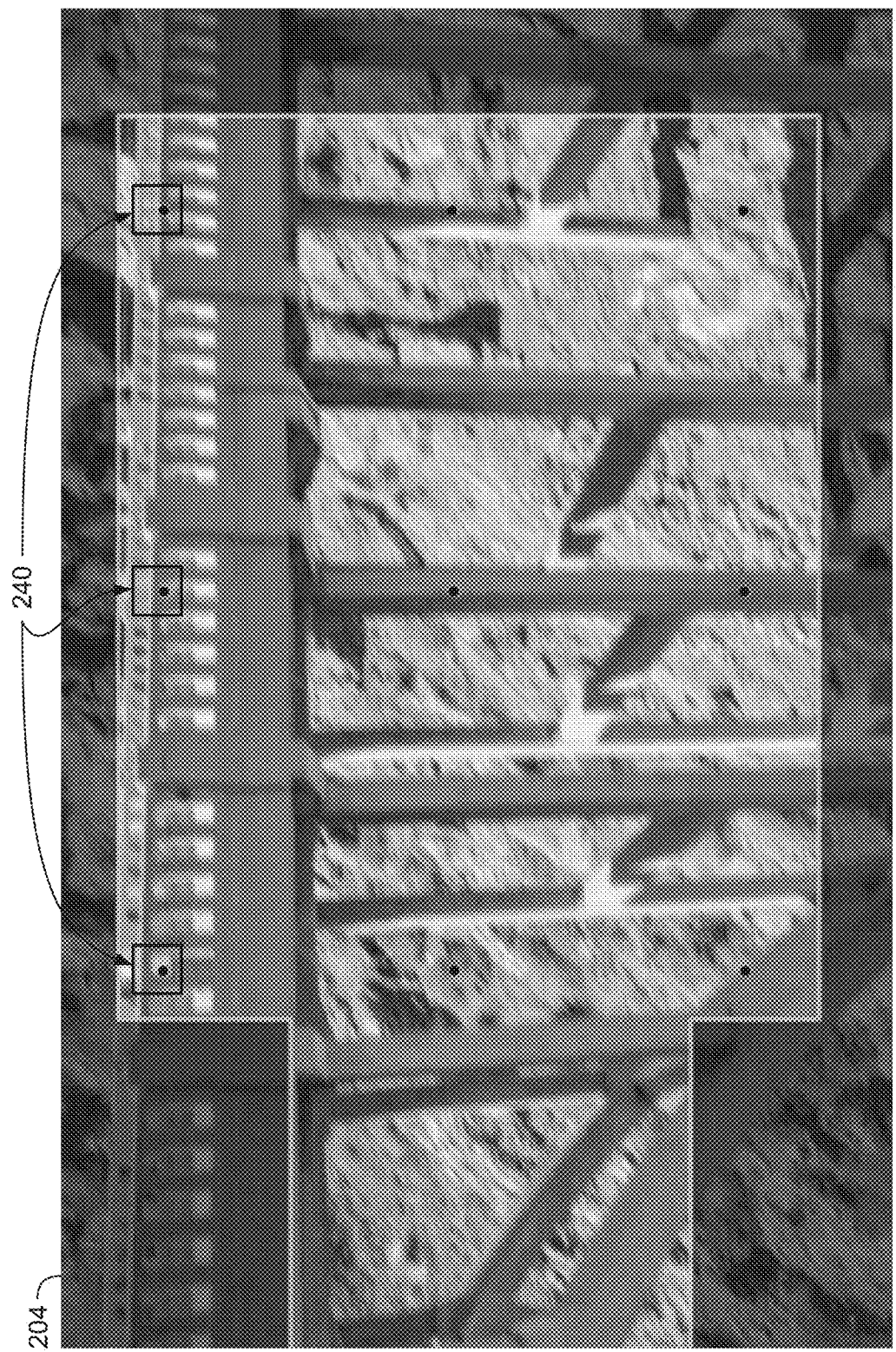

FIGS. 2A-C are illustrations of two dimensional source images used to generate a three-dimensional model of a target object, according to an embodiment. FIG. 2A depicts an image 200 of an object 210, in this case, a bridge. The portion of the image outlined with the box 220 can be used to generate a three-dimensional model of the bridge 210. But because of the angle at which the image was captured, many portions of the image are undesirable for use in generating the three-dimensional model. For example, many of the pixels representing the top of the bridge (within the box 220) are generally the same color and likely cannot be sufficiently differentiated to generate an accurate three-dimensional model of the top of the bridge.

FIG. 2B depicts an image 202 in which image regions have been marked for exclusion from the process of generating the three-dimensional model. For example, within the box 230, many of the pixels representing the top of the bridge 210 have been marked for exclusion. These pixels are undesirable, and so will not be used in generating the three-dimensional model. Single pixel regions can be marked for exclusion, or multi-pixel regions. FIG. 2C depicts an image 204 with a different view of the bridge 210. In this image, pixels 240 have been marked for exclusion, and so will not be used in generating the three-dimensional model.

In an embodiment, the computer system 100 illustrated in FIG. 1 can be used to mark pixels for exclusion and generate the three-dimensional model. For example, as discussed in more detail below in later figures, the image pre-processing module 122 can analyze the source image 100, identify image regions for exclusion, and mark the image regions for exclusion. The 3D point cloud generation module 124 can then use the source image 100 in generating a three-dimensional model of the bridge, excluding the regions marked for exclusion. The 3D texturing module 126 can then generate textures for the 3D point cloud. In an embodiment, the regions marked by the image pre-processing module 122 are excluded when generating textures. In another embodiment, the marked regions are re-introduced and used by the 3D texturing module 126.

Figure 3:
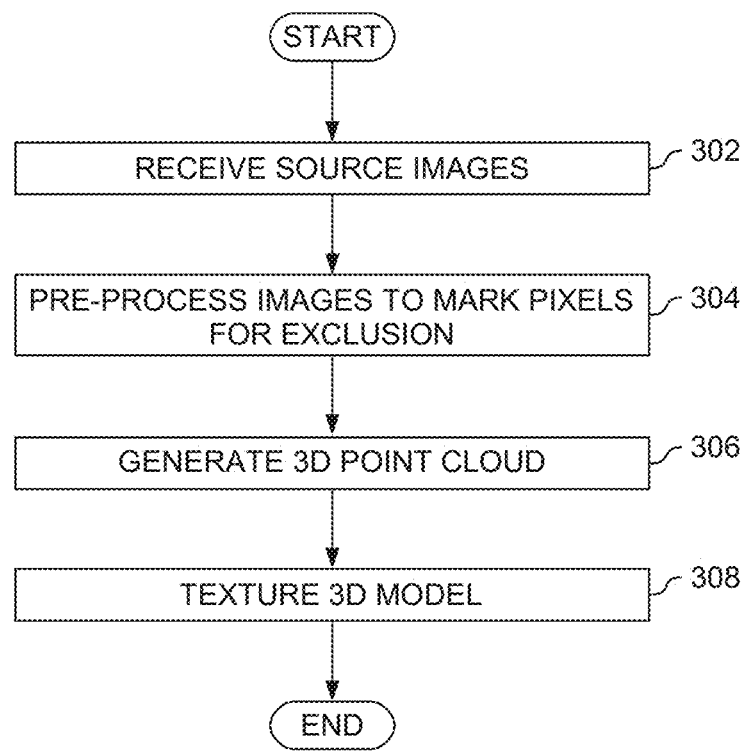
FIG. 3 is a flow chart illustrating generating a three-dimensional model of an object using a series of two dimensional images, according to an embodiment.

FIG. 3 is a flow chart illustrating generating a three-dimensional model of an object using a series of two dimensional images, according to an embodiment. At block 302, an image pre-processing module (e.g., the image pre-processing module 122 illustrated in FIG. 1) receives two dimensional source images for use in generating the three-dimensional model. In an embodiment, the source images include numerous images of a target object taken from a variety of different angles. The images can be captured by a single camera (or any other suitable image capture device) from multiple different angles and vantage points. This could be done by one user, multiple users, an automated camera setup, an autonomous vehicle (e.g., a drone), or using any other suitable setup. For example, a drone could be controlled to travel around an object and take multiple two dimensional images of the object. Alternatively, a video could be captured and frames from the video can be used as the source images.

At block 304, the pre-processing module 122 pre-processes the source images to mark pixels for exclusion. This is discussed further with regard to FIG. 4, below. At block 306, the 3D point generation module (e.g., the 3D point generation module 124 illustrated in FIG. 1) uses the source images to generate the three-dimensional point cloud. This can be done using known photogrammetry techniques, in which a number of source images are used for bundle adjustment and generating a three-dimensional point cloud, except that pixels marked for exclusion in block 304 are ignored. For example, photogrammetry techniques can match pixels across images to identify edges and features of an object. In known techniques, all pixels in the source images are used and matched between images. But at block 306, pixels marked for exclusion in the source images are ignored and not used when generating the three-dimensional point cloud. In an embodiment, the three-dimensional point cloud generated at block 306 can be output directly, without texturing. In another embodiment, textures can be added to the three-dimensional point cloud.

At block 308, the 3D texturing module (e.g., the 3D texturing module 126 illustrated in FIG. 1) adds textures to the three-dimensional point cloud generated at block 306. These textures can be added using the source images, while still ignoring the pixels identified for exclusion at block 304. Alternatively, the pixels marked for exclusion can be reintroduced and the textures can be added using the complete source images. The three-dimensional model (e.g., the three-dimensional point cloud or the three-dimensional point cloud with textures) can be used for numerous applications, including rendering for a virtual camera, as a starting point for building a more refined three-dimensional model, in a virtual or augmented reality application, for virtual location scouting, and for numerous other applications.

Figure 4:
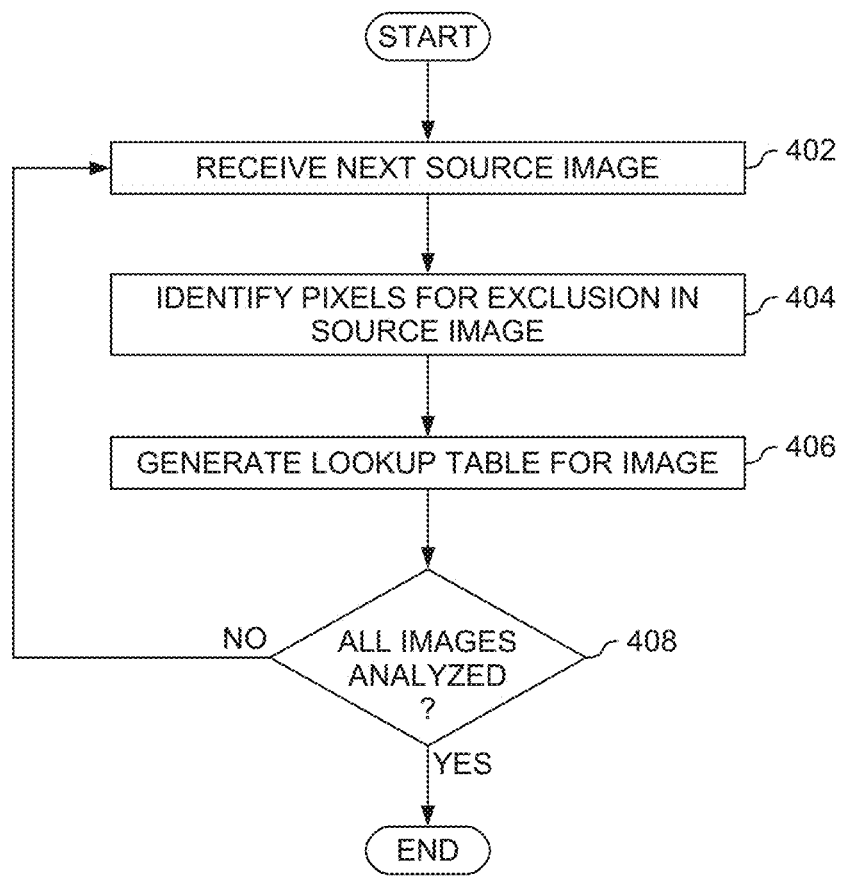
FIG. 4 is a flow chart illustrating pre-processing of images for use in generating a three-dimensional model of an object, according to an embodiment.

FIG. 4 is a flow chart illustrating pre-processing of images for use in generating a three-dimensional model of an object, according to an embodiment. This can be, for example, an illustration of block 304 illustrated in FIG. 3. At block 402, the image pre-processing module 122 receives the next source image for pre-processing. At block 404, the pre-processing module 122 identifies pixels for exclusion in the source image. In an embodiment, pixels in the source image can be marked for exclusion (and ignored when generating the three-dimensional point cloud) because other source images will include better views of the depicted aspect of the target object, and those source images can be used instead.

Pixels can be identified for exclusion using any suitable rule or set of rules. For example, pixels in a source image that lack detail about the target object may not be useful in generating a three-dimensional model of the target object. These pixels can be identified based on the color (or other attributes) of the surrounding pixels. A pixel that has other pixels of the same, or a similar, color, near it is likely to be suitable for exclusion and could be marked for exclusion. As another example, pixels depicting a blurry or unfocused view of the target object may be suitable for exclusion. These blurry pixels could be identified using known techniques, as will be familiar to a person of ordinary skill in the art, and marked for exclusion. In an embodiment, the source images might include RGB-D data, that includes both color and depth data. The depth data can also be used to identify pixels for exclusion (e.g., a pixel with depth data sufficiently different from a surrounding pixel or pixels might be marked for exclusion) and can be used in generating the three-dimensional point cloud.

In another example, multiple source images can be analyzed together to identify pixels for exclusion in the current source image. For example, the pre-processing module 122 could compare a region in one source image with an apparently comparable region in another source image. The pre-processing module 122 could determine that one source image includes a better depiction of the target object in the identified region, and mark the pixels in the weaker depiction for exclusion. In addition, characteristics about the number or quality of source images could be used. In an embodiment, the pre-processing module 122 can mark more pixels for exclusion in each source image if a large number of high resolution source images are available, and can mark fewer pixels for exclusion if a relatively smaller number of lower resolution source images are available. The more source images are available, the less necessary any given portion of an individual image is likely to be in generating the three-dimensional point cloud.

As another example, higher (or lower) resolution images may be more desirable when generating the three-dimensional image. For example, if detail about a particular aspect of the target object is missing in other source images, a source image with a higher resolution capture of the missing aspect could be particularly desirable—source images with lower resolution depictions of the missing aspect could be marked for exclusion. Alternatively, if a lower resolution source image includes sufficient detail about a particular aspect of the target, this lower resolution image could be used in place of higher resolution images. This speeds up and simplifies generation of the three-dimensional model, since fewer pixels must be analyzed. In this scenario, images with higher resolution depictions of the target object could be marked for exclusion.

In another embodiment, machine learning can be used to identify rules to use in identifying pixels for exclusion. For example, a convolutional neural network could be used. In an embodiment, the network could be trained using a supervised learning model. It could be fed sample images with pixels pre-tagged for exclusion as inputs, and could use those inputs to generate rules for use in identifying pixels for exclusion in additional images.

As discussed above with regard to FIG. 1, in one embodiment pixels are marked for exclusion directly in the source images. For example, the pixel values could be set to a particular value, and the 3D point generation module (e.g., the 3D point generation module 124 illustrated in FIG. 1) could be configured to ignore pixels with that value. Alternatively, the pixel values could be set to null, and the 3D point generation module 124 could be configured to ignore the null values.

But actually modifying the source images can be computationally expensive. Storing the modified version of the image to memory is generally slow, and requires significant computational resources. Further, a copy of the image might be kept to ensure that the original image can be recovered. To avoid this, a lookup table associated with the image could be used instead.

At block 406, the image pre-processing module 122 generates the lookup table associated with the subject source image. For example, a two dimensional binary array (or table) could be initialized to represent each pixel in the array. A "high" value (e.g., 1) could be set in the cell corresponding to pixels that should be ignored, and a "low" value (e.g., 0) could be set in the cell corresponding to the pixels that should be used. The 3D point generation module 124 could then use the lookup table corresponding to the image, when generating the 3D point cloud, to identify which pixels should be used and which should be ignored. This is more efficient computationally and in terms of memory use, because it avoid unnecessary loads and stores to memory of the source images.

In one embodiment, a lookup table can be initialized prior to identifying pixels for exclusion in block 404. In this embodiment, each pixel can be individually analyzed in the source image (e.g., top-down and left-right, or in any other suitable order), and the corresponding cell in the lookup table can be set appropriately. Alternatively, a list of pixels for exclusion could be maintained at block 404 and the list could be used to generate and populate the lookup table at block 406.

At block 408, the image pre-processing module 122 determines whether all source images have been analyzed. If no, the image pre-processing module 122 returns to block 402 and analyzes the next source image. If yes, the process ends.

The embodiments discussed and illustrated above discuss analyzing pixels for exclusion on a pixel-by-pixel basis. But this is simply one example. As discussed herein, an image region includes a single pixel, or a group of multiple pixels. The same general techniques can be used with single-pixel regions and with multi-pixel regions. For example, multi-pixel regions could be marked for exclusion, instead of individual pixel regions. A lookup table could maintain values for multi-pixel regions, and the various multi-pixel regions could be marked accordingly.

Further, the embodiments discussed above focus on the use of pixel data in the source images. In an embodiment, information about the location and orientation of the image capture devices used to capture the source images can be used to identify pixels for exclusion. For example, a camera in an automated vehicle (e.g., a drone) could provide GPS or other information for the various source images. This information could be used to identify source images that are likely to more (or less) accurately represent particular aspects of the target object.

Figure 5:
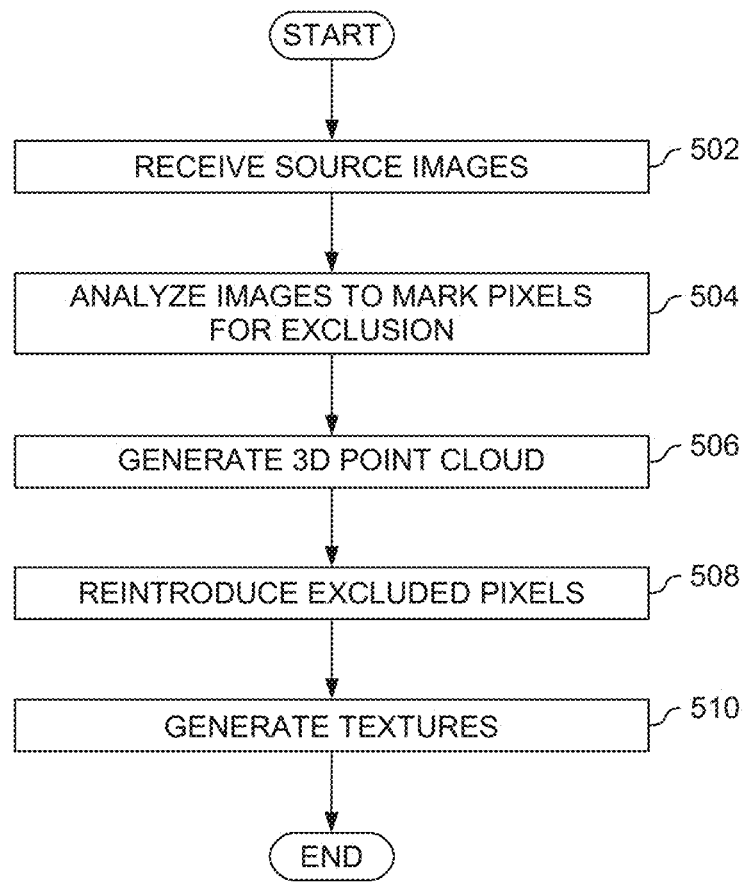
FIG. 5 is a flow chart illustrating generating a three-dimensional model of an object using a series of two dimensional images, according to an embodiment.

FIG. 5 is a flow chart illustrating generating a three-dimensional model of an object using a series of two dimensional images, according to an embodiment. At block 502, the image pre-processing module 122 receives the source images. This is similar to block 302, discussed above with regard to FIG. 3, and will not be repeated. At block 504, the image pre-processing module 122 analyzes the source images to mark pixels for exclusion. This is similar to block 304, discussed above with regard to FIGS. 3 and 4, and will not be repeated. At block 506, the 3D point cloud generation module 124 generates the 3D point cloud using the source images, but ignores the pixels marked for exclusion. This is similar to block 306, discussed above with regard to FIG. 3, and will not be repeated.

At block 508, the pixels marked for exclusion are reintroduced to the source images. This can be done by any of the modules 122, 124, and 126 illustrated in FIG. 1, or by any other suitable module. In an embodiment, if the source images were directly modified when marking images for exclusion, the modified source images could be replaced with backup copies of the original images. Alternatively, if lookup tables were used (as described with regard to block 406 in FIG. 4, above), the lookup tables could simply be ignored when processing the source images. At block 510, the 3D texturing module 126 generates textures for the 3D point cloud. In an embodiment, these textures can be generated using known techniques, and using the source images (including the pixels previously marked for exclusion at block 504).

Figure 6:
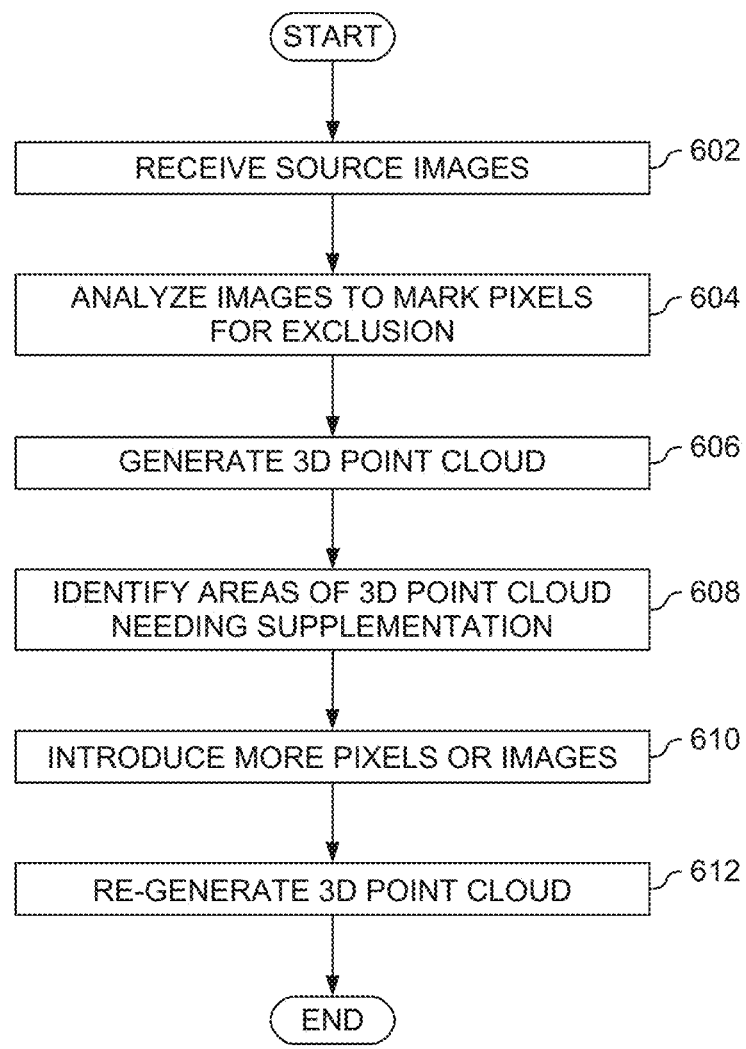
FIG. 6 is a flow chart illustrating generating a three-dimensional model of an object using a series of two dimensional images, according to an embodiment.

FIG. 6 is a flow chart illustrating generating a three-dimensional model of an object using a series of two dimensional images, according to an embodiment. At block 602, the image pre-processing module 122 receives the source images. This is similar to block 602, discussed above with regard to FIG. 3, and will not be repeated. At block 604, the image pre-processing module 122 analyzes the source images to mark pixels for exclusion. This is similar to block 304, discussed above with regard to FIGS. 3 and 4, and will not be repeated. At block 606, the 3D point cloud generation module 124 generates the 3D point cloud using the source images, but ignoring the pixels marked for exclusion. This is similar to block 306, discussed above with regard to FIG. 3, and will not be repeated.

At block 608, areas of the three-dimensional point cloud that are likely inaccurate or insufficient, and need supplementation, can be identified. This can be done using the modules 122, 124, or 126 illustrated in FIG. 1, or using any other suitable module. For example, if too many pixels are marked for exclusion in block 604, portions of the three-dimensional point cloud may not be sufficiently developed in block 606. At block 610, the pre-processing module 122 re-introduces additional information to supplement the 3D point cloud. In an embodiment, the pre-processing module 122 can re-introduce some (or all) pixels or pixel areas previously marked for exclusion. In another embodiment, additional source images can be introduced. For example, additional images of the object might be captured and introduced. Or previously captured images not previously provided in block 602 might be added. At block 612, the 3D point cloud generation module 124 regenerates the 3D point cloud using the supplemental data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of generating a three-dimensional model of a target object, comprising:
   analyzing a first source image, of a plurality of source images of a target object, to identify a first region of the first source image, the first region having attributes meeting one or more pre-defined criteria;
   marking the first region for exclusion from use in generating a three-dimensional point cloud for the target object and inclusion in generating one or more textures relating to the target object; and
   generating a three-dimensional model of the target object using the plurality of source images, comprising:
      generating the three-dimensional point cloud for the target object while excluding the first region; and
      generating the one or more textures relating to the target object using the first region.

2. The method of claim 1, wherein the one or more pre-defined criteria comprise a rule associated with excluding image regions from use in generating the three-dimensional point cloud, the method further comprising:
   analyzing the first source image using the rule to identify the first region for exclusion.

3. The method of claim 2, wherein the rule relates to a first color of a first pixel in the first region and one or more colors of one or more pixels surrounding the first pixel.

4. The method of claim 2, wherein the rule relates to comparing pixels in the first source image with pixels in a second source image, of the plurality of source images.

5. The method of claim 1, wherein generating the three-dimensional model of the target object using the plurality of source images further comprises:
   applying the one or more textures to the three-dimensional point cloud.

6. The method of claim 1, wherein marking the first region for exclusion from use in generating the three-dimensional point cloud for the target object comprises:
   identifying a lookup table associated with the first source image; and modifying a cell in the lookup table corresponding to the first region to signify that the first region is marked for exclusion.

7. The method of claim 6, wherein generating the three-dimensional model of the target object using the plurality of source images comprises analyzing the identified lookup table.

8. The method of claim 6, wherein the lookup table comprises a two-dimensional array with dimensions related to a size of the first source image.

9. A computer program product for generating a three-dimensional model of a target object, the computer program product comprising:
a non-transitory computer-readable storage medium having computer-readable program code embodied therewith, wherein the program code, when executed by a processor, performs an operation, the operation comprising:
analyzing a first source image, of a plurality of source images of a target object, to identify a first region of the first source image, the first region having attributes meeting one or more pre-defined criteria;
marking the first region for exclusion from use in generating a three-dimensional point cloud for the target object and inclusion in generating one or more textures relating to the target object; and
generating a three-dimensional model of the target object using the plurality of source images, comprising:
generating the three-dimensional point cloud for the target object while excluding the first region; and
generating the one or more textures relating to the target object using the first region.

10. The computer program product of claim 9, wherein the one or more pre-defined criteria comprise a rule associated with excluding image regions from use in generating the three-dimensional point cloud, the operation further comprising:
analyzing the first source image using the rule to identify the first region for exclusion.

11. The computer program product of claim 10, wherein the rule relates to a first color of a first pixel in the first region and one or more colors of one or more pixels surrounding the first pixel.

12. The computer program product of claim 10, wherein the rule relates to comparing pixels in the first source image with pixels in a second source image, of the plurality of source images.

13. The computer program product of claim 9, wherein generating the three-dimensional model of the target object using the plurality of source images further comprises:
applying the one or more textures to the three-dimensional point cloud.

14. The computer program product of claim 9, wherein marking the first region for exclusion from use in generating the three-dimensional point cloud for the target object comprises:
identifying a lookup table associated with the first source image; and
modifying a cell in the lookup table corresponding to the first region to signify that the first region is marked for exclusion, wherein generating the three-dimensional model of the target object using the plurality of source images comprises analyzing the identified lookup table.

15. A system, comprising:
a processor; and
a memory storing a program, which, when executed on the processor, performs an operation, the operation comprising:
analyzing a first source image, of a plurality of source images of a target object, to identify a first region of the first source image, the first region having attributes meeting one or more pre-defined criteria;
marking the first region for exclusion from use in generating a three-dimensional point cloud for the target object and inclusion in generating one or more textures relating to the target object; and
generating a three-dimensional model of the target object using the plurality of source images, comprising:
generating the three-dimensional point cloud for the target object while excluding the first region; and
generating the one or more textures relating to the target object using the first region.

16. The system of claim 15, wherein the one or more pre-defined criteria comprise a rule associated with excluding image regions from use in generating the three-dimensional point cloud, the operation further comprising:
analyzing the first source image using the rule to identify the first region for exclusion.

17. The system of claim 16, wherein the rule relates to a first color of a first pixel in the first region and one more colors of one or more pixels surrounding the first pixel.

18. The system of claim 15, wherein generating the three-dimensional model of the target object using the plurality of source images further comprises:
applying the one or more textures to the three-dimensional point cloud.

19. The system of claim 15, wherein marking the first region for exclusion from use in generating a three-dimensional point cloud for the target object comprises:
identifying a lookup table associated with the first source image; and
modifying a cell in the lookup table corresponding to the first region to signify that the first region is marked for exclusion, wherein generating the three-dimensional model of the target object using the plurality of source images comprises analyzing the identified lookup table.

* * * * *